United States Patent [19]

Callahan

[11] Patent Number: 5,482,539
[45] Date of Patent: Jan. 9, 1996

[54] MULTIPLE STAGE SEMI-PERMEABLE MEMBRANE PROCESS AND APPARATUS FOR GAS SEPARATION

[75] Inventor: Richard A. Callahan, Burlington, Vt.

[73] Assignee: Enerfex, Inc., Burlington, Vt.

[21] Appl. No.: 320,273

[22] Filed: Oct. 11, 1994

Related U.S. Application Data

[63] Continuation-in-part of Ser. No. 124,577, Sep. 22, 1993, abandoned.

[51] Int. Cl.$^6$ .................................................. B01D 53/22
[52] U.S. Cl. .................................... 95/51; 95/45; 95/55
[58] Field of Search ........................... 95/45, 51, 55, 95/47–50, 52–54; 96/4, 7–9

[56] References Cited

U.S. PATENT DOCUMENTS

| | | | |
|---|---|---|---|
| 2,966,235 | 12/1960 | Kammermeyer | 95/51 |
| 4,130,403 | 12/1978 | Cooley et al. | 95/51 X |
| 4,264,338 | 4/1981 | Null | 96/9 X |
| 4,435,191 | 3/1984 | Graham | 95/51 |
| 4,597,777 | 7/1986 | Graham | 95/51 |
| 4,602,477 | 7/1986 | Lucadamo | 95/51 X |
| 4,639,257 | 1/1987 | Duckett et al. | 95/51 X |
| 4,690,695 | 9/1987 | Doshi | 95/55 |
| 4,701,187 | 10/1987 | Choe et al. | 95/55 X |
| 4,990,168 | 2/1991 | Sauer et al. | 95/51 X |
| 5,102,432 | 4/1992 | Prasad | 95/54 |
| 5,205,842 | 4/1993 | Prasad | 96/9 X |
| 5,233,837 | 8/1993 | Callahan | 62/38 |
| 5,282,968 | 2/1994 | Xu | 95/45 X |
| 5,282,969 | 2/1994 | Xu | 95/45 X |

FOREIGN PATENT DOCUMENTS

| | | | |
|---|---|---|---|
| 2652432 | 5/1977 | Germany | 95/45 |
| 59-207827 | 11/1984 | Japan | 95/55 |
| 62-167390 | 7/1987 | Japan | 95/51 |
| 62-286517 | 12/1987 | Japan | 96/9 |
| 63-151332 | 6/1988 | Japan | 95/55 |
| 1-043329 | 2/1989 | Japan | 95/51 |
| 4-180812 | 6/1992 | Japan | 95/51 |
| 1119718 | 10/1984 | U.S.S.R. | 95/51 |

*Primary Examiner*—Robert Spitzer
*Attorney, Agent, or Firm*—Sughrue, Mion, Zinn, Macpeak & Seas

[57] ABSTRACT

A membrane process and apparatus are described for the production of a desired very high purity permeate gas by use of a multiple stage membrane process wherein in a primary stage a process feed gas mixture is provided to a primary membrane separator unit comprising a membrane having a relatively high intrinsic permeability to provide an intermediate permeate gas and a retentate gas, and providing the intermediate permeate gas in a secondary stage to a secondary membrane separator unit comprising a membrane having a relatively low intrinsic permeability, to produce therefrom a very high purity permeate gas product.

11 Claims, 2 Drawing Sheets

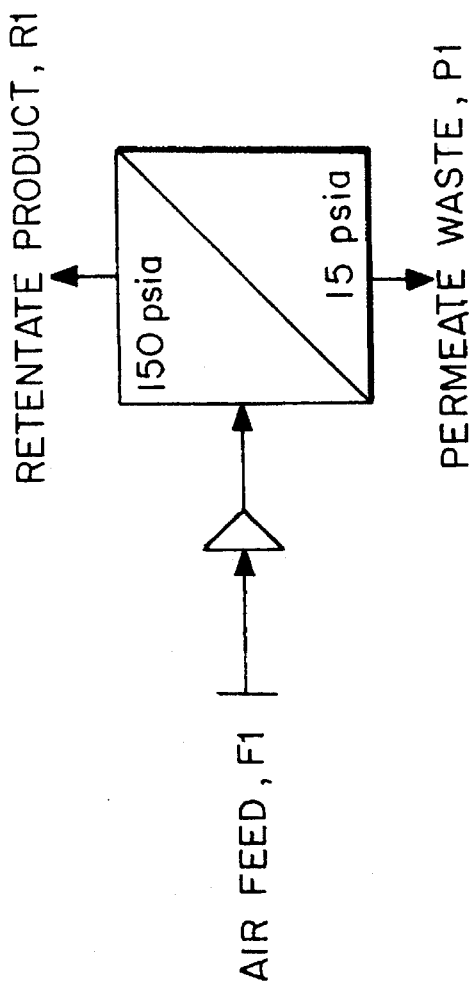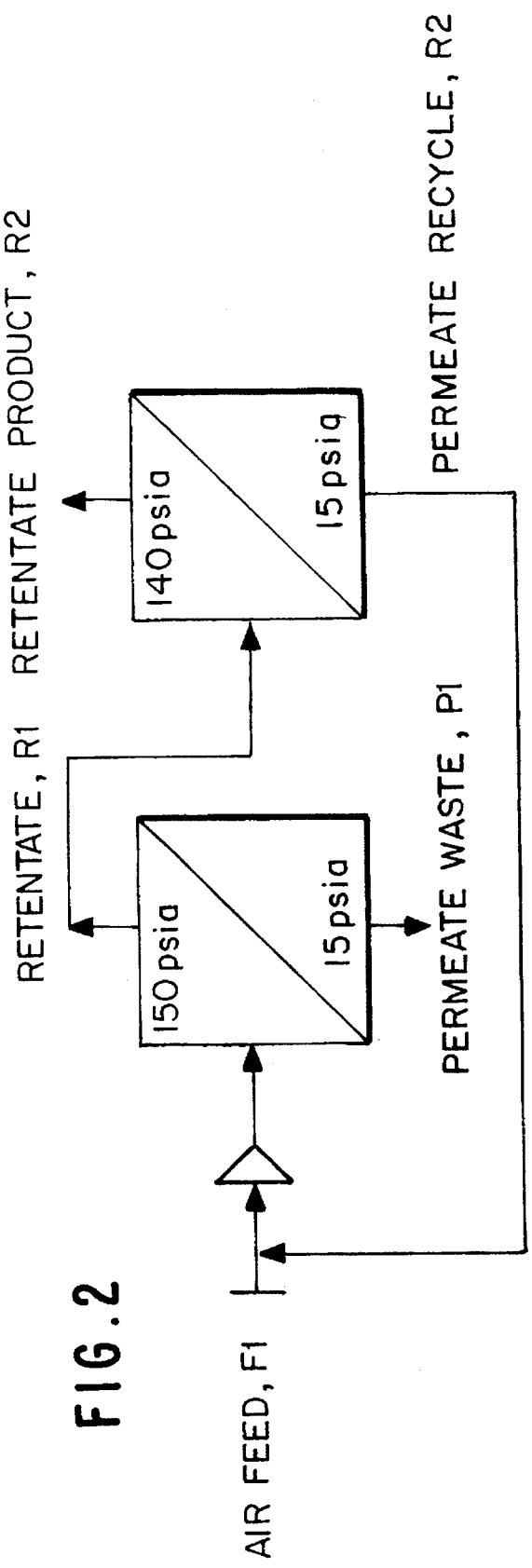

MULTIPLE STAGE SEMI-PERMEABLE MEMBRANE PROCESS AND APPARATUS FOR GAS SEPARATION

FIELD OF THE INVENTION

This is a continuation-in-part of application Ser. No. 08/124,577, filed Sep. 22, 1993, now abandoned.

The present invention relates to a process and apparatus for the production of a high purity gas which in general is more permeable in polymeric membranes relative to other gases with which it is mixed. The more permeable gas, e.g., carbon dioxide, is separated and concentrated by permeating through specific membrane stages to a high purity.

BACKGROUND OF THE INTENTION

U.S. Pat. No. 4,990,168 to Sauer et al describes a two or more stage membrane and distillation process to separate and concentrate carbon dioxide from a destination tail gas mixture containing it in a high concentration of about 75% $CO_2$. The nature and composition of the membrane material is described in detail, and polyimide, polyarimid, polyester, polyamide and cellulose acetate are noted as examples. The use of different membrane materials with different properties for application in different stages is not described.

Furthermore, although a process such as that described in the Sauer '168 patent may be useful in limited localities where gas mixtures containing carbon dioxide in a high concentration are available, such as the tail gas of a typical $CO_2$ liquefier, such a process is of little value in the more numerous localities where gas containing carbon dioxide in a high concentration is not readily available, such as a fossil fuel combustion exhaust or limekiln vent gas. Therefore, the Sauer '168 patent does not address adequately the problem of providing high purity carbon dioxide in localities in which a source containing carbon dioxide in a relatively high concentration is not readily available.

U.S. Pat. No. 5,102,432 to Prasad describes a two or more stage membrane process to separate and concentrate high purity nitrogen from ambient air. This process relates to concentrating the less permeable component of a gas mixture to high purity by refining it by passing it through successive stages as a high pressure non-permeate phase. The Prasad '432 patent describes that a permeate stream of a downstream membrane is recycled to the initial feed and/or to the non-permeate phase of an upstream membrane. Also, the Prasad '432 patent specifies a range of membrane selectivities.

A need has continued to exist for improved processes and apparatus for providing high purity gases in an economical and efficient manner; in particular, an improved process and apparatus for providing local production of high purity carbon dioxide starting from abundantly available low concentration sources as mentioned above has been strongly desired.

SUMMARY OF THE INVENTION

In accordance with the present invention, there is provided a membrane process for the production of very high purity permeate gas a desired product from a feed gas mixture containing less than 40 mol % of the desired permeate gas, which process comprises providing in a primary stage the process feed gas mixture to a primary membrane separator unit comprising a membrane having a relatively high intrinsic permeability to provide an intermediate permeate gas and a retentate gas, and providing the intermediate permeate gas in a secondary stage to a secondary membrane separator unit comprising a membrane having a relatively high selectivity, to produce therefrom a very high purity permeate gas product. Preferably, the membrane of the primary membrane separator unit has an intrinsic permeability of more than 250 Barrer/cm×$10^4$. Also preferably, the membrane of the secondary membrane separator unit has an intrinsic permeability of 250 Barrer/cm×$10^4$ or less.

In another aspect, the present invention relates to an apparatus for carrying out the process of the invention, i.e., an apparatus comprising a means for providing a process feed gas mixture to a primary stage membrane separator unit, which unit comprises a membrane having a relatively high intrinsic permeability, and a means for providing an intermediate permeate gas produced from said primary stage membrane separator unit to a secondary stage membrane separator unit, which unit comprises a membrane having a relatively low intrinsic permeability.

BRIEF DESCRIPTION OF THE DRAWINGS

FIG. 1 illustrates a conventional one stage membrane separation process wherein a highly purified retentate $N_2$ product is obtained by subjecting air to a separator unit comprising a conventional polymer membrane.

FIG. 2 illustrates a two stage process wherein $N_2$ gas is produced as a highly purified retentate gas in a two stage membrane process, with recycling of the $N_2$-enriched permeate from the second stage to the initial air feed.

DETAILED DESCRIPTION OF THE INVENTION

Figure 3:
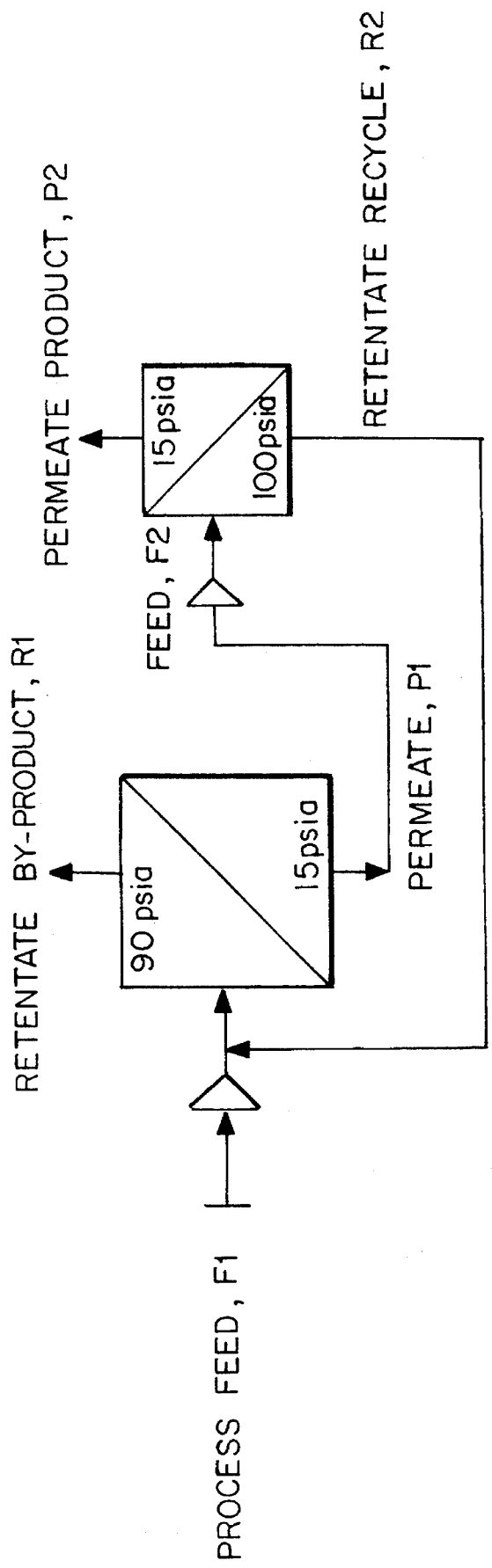
FIG. 3 illustrates processes wherein a permeate product is purified in two stages, with recycling of the retentate from the second stage to the process feed, including embodiments of the present invention as described below.

In accordance with the present invention, it has been found that for some gas separations it is generally beneficial to use more than one membrane stage, comprising using membranes in succeeding stages having lower intrinsic permeability. Specifically, for gas mixture separations where it is desirable to separate and concentrate the more permeable component to a purity of about 96.0+% (by volume), it has been found that lesser total membrane area is required when a two or more stage membrane system is employed wherein a primary stage utilizes a membrane having a relatively high intrinsic permeability in a primary membrane separator unit, and a secondary stage or succeeding stages utilize a membrane having a relatively low intrinsic permeability. Examples of common gases that exhibit relatively high intrinsic permeability when so treated are carbon dioxide and hydrogen.

A membrane having a relatively high intrinsic permeability needs a smaller area for a given gas flow, however, it also generally shows less selectivity between gases. By comparison, a membrane having relatively high selectivity generally has lower intrinsic permeability for constituent gases of a mixture. However the low intrinsic permeability in the second or succeeding membrane separator stages is not a limitation, because of the reduced flow in the concentrated product permeate feed from the previous membrane separator stage or stages. In the second membrane separator stage, the higher selectivity ensures the highest final permeate product purity. Therefore, in accordance with the present invention, it has now been found that by combining successively higher selectivity membrane separator stages into a multiple stage membrane process, it is possible to achieve both high permeability and high selectivity in a unitary membrane process, and thus use smaller membranes with higher efficiency. More specifically, in an ideal multiple stage membrane process in accordance with the present invention, the initial primary stage utilizes a high intrinsic permeability membrane whereby intermediate concentration levels (40 to 80 vol %) of the desired very high purity permeate gas product in the intermediate permeate gas are achieved with minimal membrane area. In accordance with the present invention, the secondary or succeeding stages utilized low intrinsic permeability membranes, whereby high levels of about 96.0+% of permeate concentration are achieved with minimal membrane area. Concentrated and reduced permeate flow from the initial stages accommodates the successive or second membrane's lower intrinsic permeability.

The generally accepted unit of permeability is known as the Barrer, and is usually expressed in the following units: $p=(cm^3*cm)\_(cm^2*sec*cm\ Hg)*10^{-10}$. The intrinsic permeability is permeability divided by the membrane permaselective barrier thickness, and is usually expressed in the following units: $P/L=(cm^3)\_(cm^2\times sec\times cm\ Hg)\times 10^{-10}$, wherein L is the barrier thickness (in cm).

The selectivity of a more permeable gas over a less permeable gas is defined as the ratio of their permeabilities. Intrinsic permeabilities in Barrers/cm$\times 10^4$ of typical membrane materials are given below for four common gases, as well as the $CO_2/N_2$ and $O_2/N_2$ selectivities.

|  | silicone/ polycarbonate L = 0.0001 cm | cellulose acetate L = 0.00001 cm | poly- carbonate L = 0.00001 cm |
|---|---|---|---|
| Gas |  |  |  |
| $CO_2$ | 970.0 | 110 | 35 |
| $H_2$ | 210.0 | 84 | 140 |
| $O_2$ | 160.0 | 33.0 | 5.25 |
| $N_2$ | 70.0 | 5.5 | 0.875 |
| Selectivity Ratios |  |  |  |
| $CO_2/N_2$ | 13.86 | 20.0 | 40.0 |
| $O_2/N_2$ | 2.29 | 6.0 | 6.0 |

From Fick's Law of diffusion combined with Henry's Law of sorption, it is seen that the gas permeation flux (V) (flow volume per unit area per unit time) across a membrane for any component is equal to its intrinsic permeability (P/L) times its partial pressure difference (p1–p2) across the membrane barrier where p is the partial pressure in the higher pressure retentate side and $P_2$ is the partial pressure in the lower pressure permeate side: V=P/L (p1–p2).

A desirable component of a gas mixture may be either more permeable or less permeable than the other components of the mixture. If the desired component is the less permeable species, then the membrane is said to be retentate selective and the feed stream is refined to a high purity in the retained or less permeable (retentate) component. The reed-retentate phase is present on the high pressure upstream side of the membrane and is referred to hereinafter as the retentate phase. On the downstream side of the membrane there is provided a permeate phase at a much lower pressure, usually slightly above one atmosphere. Almost all commercial membrane processes currently operate to refine a retentate to high purity, usually with a single stage membrane. An example is the separation of oxygen from air, or more aptly the production of nitrogen enriched air. For instance, a feed stream of ambient air containing about 79 vol % nitrogen and 21 vol % oxygen is pressurized and passed over the upstream side of a polycarbonate membrane. As this happens, the more permeable oxygen permeates the membrane much more rapidly than nitrogen, leaving behind about a 99% pure nitrogen retentate product phase and generating about a 31.5 vol % oxygen (68.5 vol % nitrogen) permeate waste phase, which is typically dumped back to the atmosphere.

Another commercial example is the separation of carbon dioxide from wellhead natural gas, or more aptly, the production of methane enriched or pipeline quality gas. A feed stream of wellhead gas at 93 vol % methane and 7 vol % carbon dioxide at pressure is passed over the upstream side of a cellulose acetate membrane. The more permeable carbon dioxide permeates more quickly, yielding a 98% pure methane retentate product phase, and generating about a 37% pure carbon dioxide permeate waste phase, which is typically flared to the atmosphere at the production site. Normally a single stage membrane like those mentioned above is best suited to bring the retentate phase to its asymptotic purity concentration, 99.0+%, in a single pressurized retentate phase. Optimum performance of a single stage retentate membrane is achieved by matching feed flux (flow volume per unit area per unit time) and membrane surface area.

A flow diagram for a typical single stage membrane of polycarbonate to produce a nitrogen enriched retentate is shown in FIG. 1. In all cases the feed gas is pressurized ambient air. The asymptotic retentate product phase concentration can be increased to 99.5 vol %, and even 99.95 vol %, by feeding the pressurized retentate stream to subsequent membrane stages to further refine the nitrogen enriched stream. The ultimate purity of the retentate product phase is a function of the feed flow rate and total membrane area. In the case of multiple stages, all stages utilize the same low intrinsic permeability membrane because of its relatively high oxygen over nitrogen selectivity and the relatively high initial nitrogen feed purity of 79%.

FIG. 2 is an example of a two stage process to produce nitrogen of up to 99.5 vol % purity. A multiple stage membrane process according to the present invention would not benefit such an air separation where a high purity nitrogen retentate product phase is desired, because the relatively high intrinsic permeability of the primary membrane separator stage plus the relatively high initial feed concentration of nitrogen in air would allow excessive amounts of nitrogen to permeate through the membrane, thereby reducing the recovery of nitrogen in the retentate.

The multiple stage membrane process in accordance with the present invention is optimally utilized when the object is to concentrate by a membrane process a desired gas as a permeate from a relatively low initial level of 40% or lower to a level of about 96.0 vol % or higher purity.

FIG. 3 shows a two stage membrane process according to this invention, capable of separating carbon dioxide to a level of about 96.0+ vol % purity with process flows as noted in Table 3 below. Table 1 below shows an example of flow rates, material balances, and membrane areas for a process as shown in FIG. 3 in a comparative case wherein both membranes are of a single composition, viz., polycarbonate. The process feed gas mixture, F1, is 11.7% carbon dioxide and 88.3% nitrogen, which is the composition of a natural gas combustion exhaust after the water of combustion is removed.

Table 1 shows that the first stage requires about 70,713 square feet of membrane and the second stage

TABLE 1

| | AREA, FT2 | STREAM | FLOW, SCFH | CONC., VOL % | PRESS., PSIA |
|---|---|---|---|---|---|
| STAGE 1 POLYCARBONATE | | | | | |
| INTRINSIC PERMEABILITIES (BARRER/CM × 10000) CO2: 35  N2: 0.875 SELECTIVITY CO2/N2: 40 | 70,713 | FRESH FEED, F1 RETENTATE, R1 PERMEATE, P1 | 37,973 34,443 7,336 | 11.7 3.1 58.9 | 90 80 15 |
| STAGE 2 POLYCARBONATE | | | | | |
| INTRINSIC PERMEABILITIES (BARRER/CM × 10000) CO2: 35  N2: 0.875 SELECTIVITY CO2/N2: 40 | 4,600 | FEED, F2 RETENTATE, R2 PERMEATE, P2 | 7,336 3,793 3,542 | 58.9 24.3 96.0 | 100 90 15 | requires about 4,600 square feet of membrane, or a total area of 75,313 square feet of membrane, to achieve 96.0 vol % carbon dioxide purity in P2 with about 76.5 vol % of the carbon dioxide initially present in the process feed gas mixture being recovered. That is, 23.5 vol % of the carbon dioxide in the feed F1 is dumped as waste in the first stage retentate stream, R1.

Referring to FIG. 3 again, Table 2 shows a similar process and similar flows as in Table 1, except, in accordance with the present invention, the first stage utilizes a cellulose acetate membrane instead of polycarbonate.

Quite significantly, in this case it has been found that the first stage requires only about 20,055 square feet of membrane, and the combined stages require only a total area of only about 24,648 square feet, to achieve the same results.

Referring to FIG. 3 again, Table 3 shows a similar process and flows as in Table 1 and Table 2, except that in accordance with another embodiment of the present invention, the first stage utilizes a silicone

TABLE 2

| | AREA, FT2 | STREAM | FLOW, SCFH | CONC., VOL % | PRESS., PSIA |
|---|---|---|---|---|---|
| STAGE 1 CELLULOSE TRIACETATE | | | | | |
| INTRINSIC PERMEABILITIES (BARRER/CM × 10000) CO2: 110  N2: 5.5 SELECTIVITY CO2/N2: 20 | 20,255 | FRESH FEED, F1 RETENTATE, R1 PERMEATE, P1 | 37,540 33,999 11,013 | 11.7 3.0 52.1 | 90 80 15 |
| STAGE 2 POLYCARBONATE | | | | | |
| INTRINSIC PERMEABILITIES (BARRER/CM × 10000) CO2: 35  N2: 0.875 SELECTIVITY CO2/N2: 40 | 4,593 | FEED, F2 RETENTATE, R2 PERMEATE, P2 | 11,013 7,473 3,542 | 52.1 31.3 96.0 | 100 90 15 |

TABLE 3

| AREA, FT2 | STREAM | FLOW, SCFH | CONC., VOL % | PRESS., PSIA |
|---|---|---|---|---|
| STAGE 1 <br> SILICONE POLYCARBONATE | | | | |
| INTRINSIC PERMEABILITIES <br> (BARRER/CM × 10000) <br> CO2: 970  N2: 70 <br> SELECTIVITY CO2/N2: 14 | 2,261 | FRESH FEED, F1 <br> RETENTATE, R1 <br> PERMEATE, P1 | 39,621 <br> 36,095 <br> 14,665 | 11.7 <br> 3.4 <br> 49.1 | 90 <br> 80 <br> 15 |
| STAGE 2 <br> POLYCARBONATE | | | | |
| INTRINSIC PERMEABILITIES <br> (BARRER/CM × 10000) <br> CO2: 35  N2: 0.875 <br> SELECTIVITY CO2/N2: 40 | 4,598 | FEED, F2 <br> RETENTATE, R2 <br> PERMEATE, P2 | 14,664 <br> 11,121 <br> 3,543 | 49.1 <br> 34.2 <br> 96.0 | 100 <br> 90 <br> 15 | polycarbonate copolymer membrane instead of either pure cellulose acetate or polycarbonate.

Note that in this case the first stage requires even less area, about 2,261 square feet of membrane, and the combined stages a total area of only about 6,859 square feet of membrane, to achieve the same results, i.e., ≧96.0 vol % $CO_2$. The process in Table 3 represents a preferred embodiment of the present invention.

For any user of the process and apparatus of the present invention, a major benefit is a substantial reduction in the total membrane area required to accomplish a particular desired gas separation. For any given total membrane area, this invention provides substantially higher productivity. For example, comparing Tables 1 and 3, there is shown an 90.0% reduction in membrane area for a feed stream of about 37,973 to 39,621 standard cubic feet per hour (scfh). For any given area the present invention as described in Table 3 can process 11.3 (feed flux ratio) times the feed flow compared with the homogeneous membrane process shown in Table 1.

The general process steps of the present invention are further described below, together with further explanation with respect to FIG. 3 and the data given in Table 3 as a specific preferred example of the present invention. Herein, all parts and percentages (%) are by volume, also equivalent to mole fraction, unless otherwise indicated.

The present invention is further discussed particularly in terms of a preferred embodiment of the present invention wherein the membrane feed stream is the product of the combustion of any hydrocarbon fuel, such as fossil fuel, in air. However, if a process stream is available which comprises 40 vol % or less $CO_2$, the balance typically air or nitrogen or any other less permeable gas or gases, the same can be processed in accordance with the present invention. The process of the present invention is even more preferred in the case of using a process gas stream containing 25 vol % or less $CO_2$, and is especially preferred in the case of using a process gas stream containing 11.7 vol % or less $CO_2$.

A typical exhaust of a natural gas or methane combustion device has a composition of about 11.7% carbon dioxide and 88.3% $N_2$ based on stoichiometric composition after cleaning and dehydrating steps. The pre-treated feed stream is then compressed to about 90 pounds per square inch absolute (psia) (465 cm Hg) and cooled to the recommended membrane operating temperature range of about 25° C. (77° F.) to 50° C. (122° F.). The compressed feed gas mixture then enters the first stage membrane of a two stage membrane process according to this invention. The first stage membrane is composed of a silicone/polycarbonate copolymer with a permaselective layer of about 0.0001 cm (1 μm or 10,000 Angstrom). Under these conditions of feed gas composition, pressure, and flux, the permeate gas recovered contains about 85% of the incoming carbon dioxide at about 40 vol % purity. The calculated permeate flux gives a membrane area factor of about 256 square feet per 100 pounds of carbon dioxide in the first stage permeate. The fresh feed, F1, as shown in Table 3 is about 39,621 scfh. The fresh feed F1 combined with the retentate recycle R2 from the second stage is about 50,748 scfh, and the area factor calculated above determines a required net membrane area of about 2,261 square feet in the first stage. The resultant first stage permeate flow P1 of about 14,666 scfh is compressed to about 100 psia (517 cm Hg) and cooled to the required membrane temperature as above to become F2, the second stage feed gas.

The second stage feed gas F2 then enters the secondary and final stage membrane which is composed of a polycarbonate polymer with a perma-selective layer of about 0.00001 cm (0.1 μm or 1,000 Angstrom). Under these conditions of feed composition, pressure and flux, the second stage permeate has a purity of about 96.0 vol %. The calculated permeate flux gives a membrane area factor of about 1,103 square feet per 100 pounds of carbon dioxide in the secondary stage permeate. The secondary stage feed gas F2, from Table 3, is about 14,666 scfh, and the area factor above determines a required membrane area of about 4,598 square feet in the secondary stage.

The total membrane area of both stages in the preferred embodiment is about 6,859 square feet, in which the first relatively high intrinsic permeability membrane separator, or silicone polycarbonate copolymer stage, comprises about 33.0% of the total membrane area and the second relatively low intrinsic permeability membrane separator, or polycarbonate stage, comprises stage the balance. By comparison, if both membrane stages are composed of the relatively low intrinsic permeability polycarbonate membrane as shown in Table 1, the total membrane area required for the same separation and process flow is about 75,313 square feet, with about 93.9% of the total, or 70,713 square feet, comprising the first stage. Thus a major benefit of the present invention is a very large reduction in membrane area. Conversely, for a specified size membrane system, the present invention provides very large increases (e.g., 1130%) in process capacity.

This preferred embodiment of the present invention also provides as a by-product a first stage retentate stream with relatively high nitrogen purity of about 97%, the balance carbon dioxide. Though this nitrogen purity may be considered medium in a scale of low to high purity, the stream can be used as a general purpose inert gas because carbon dioxide is also inert. The by-product retentate of this composition may be used or further purified to yield high purity nitrogen as desired.

The very high purity permeate product stream P2 in the preferred embodiment described above is subsequently desirably compressed to about 260 psia and sub-cooled to about −14° F., which is the dew point of a 99.95 vol % carbon dioxide gas mixture. The liquid carbon dioxide so produced may either be stored or used for any useful purpose.

Also with respect to the preferred embodiment described above, means for pre-treating, cooling, transporting, and compressing the various process streams in the present invention includes but is not limited to those described in U.S. Pat. No. 5,233,837 to Callahan, hereby incorporated by reference.

While the invention has been described in detail and with reference to specific embodiments thereof, it will be apparent to one skilled in the art that various changes and modifications can be made therein without departing from the spirit and scope thereof.

What is claimed is:

1. A membrane process for the production of a desired very high purity permeate gas product from a feed gas mixture containing less than 40 vol % of the desired permeate gas, which process comprises providing in a primary stage a process feed gas mixture to a primary membrane separator unit comprising a membrane having a relatively high intrinsic permeability, to provide an intermediate permeate gas and a retentate gas, and providing the intermediate permeate gas in a secondary stage to a secondary membrane separator unit comprising a membrane having a relatively high selectivity, to produce therefrom the very high purity permeate gas product.

2. A membrane process as in claim 1, wherein the primary membrane separator unit comprises a membrane with an intrinsic permeability of more than 250 Barrer/cm×$10^4$.

3. A membrane process as in claim 1, wherein the secondary membrane separator unit comprises a membrane with an intrinsic permeability of 250 Barrer/cm×$10^4$ or less.

4. A membrane process as in claim 1, wherein the primary membrane separator unit comprises a membrane with an intrinsic permeability of more than 250 Barrer/cm×$10^4$ and the secondary membrane separator unit comprises a membrane with an intrinsic permeability of less than 250 Barrer/cm×$10^4$.

5. A membrane process as in claim 1 wherein the intermediate permeate gas comprises from 40 vol % to 80 vol % of the gas to be provided as the very high purity permeate gas product.

6. A membrane process as in claim 1 which further comprises using products of fossil fuel combustion as the process feed gas mixture.

7. A membrane process as in claim 1 which further comprises using products of hydrocarbon combustion in air as the process feed gas mixture.

8. A membrane process as in claim 1 which further comprises using products of fossil fuel combustion in a limekiln as the process feed gas mixture.

9. A membrane process as in claim 1, wherein the process feed gas mixture is a process gas stream containing 25 vol % or less of carbon dioxide.

10. A membrane process as in claim 1, wherein the process feed gas mixture is a process gas stream containing 11.7 vol % or less of carbon dioxide.

11. A membrane process as in claim 1, wherein the process feed gas mixture contains carbon dioxide and carbon dioxide is recovered as the very high purity permeate gas product at a purity of more than 96.0 vol %.

* * * * *

(12) EX PARTE REEXAMINATION CERTIFICATE (10657th)
United States Patent
Callahan

(10) Number: US 5,482,539 C1
(45) Certificate Issued: Jul. 13, 2015

(54) MULTIPLE STAGE SEMI-PERMEABLE MEMBRANE PROCESS AND APPARATUS FOR GAS SEPARATION

(75) Inventor: Richard A. Callahan, Burlington, VT (US)

(73) Assignee: ENERFEX, INC., Burlington, VT (US)

Reexamination Request:
No. 90/012,343, Jun. 8, 2012

Reexamination Certificate for:
Patent No.: 5,482,539
Issued: Jan. 9, 1996
Appl. No.: 08/320,273
Filed: Oct. 11, 1994

Related U.S. Application Data

(63) Continuation-in-part of application No. 08/124,577, filed on Sep. 22, 1993, now abandoned.

(51) Int. Cl.
*B01D 53/22* (2006.01)

(52) U.S. Cl.
CPC ..................................... *B01D 53/22* (2013.01)

(58) Field of Classification Search
None
See application file for complete search history.

(56) References Cited

To view the complete listing of prior art documents cited during the proceeding for Reexamination Control Number 90/012,343, please refer to the USPTO's public Patent Application Information Retrieval (PAIR) system under the Display References tab.

*Primary Examiner* — Krisanne Jastrzab

(57) ABSTRACT

A membrane process and apparatus are described for the production of a desired very high purity permeate gas by use of a multiple stage membrane process wherein in a primary stage a process feed gas mixture is provided to a primary membrane separator unit comprising a membrane having a relatively high intrinsic permeability to provide an intermediate permeate gas and a retentate gas, and providing the intermediate permeate gas in a secondary stage to a secondary membrane separator unit comprising a membrane having a relatively low intrinsic permeability, to produce therefrom a very high purity permeate gas product.

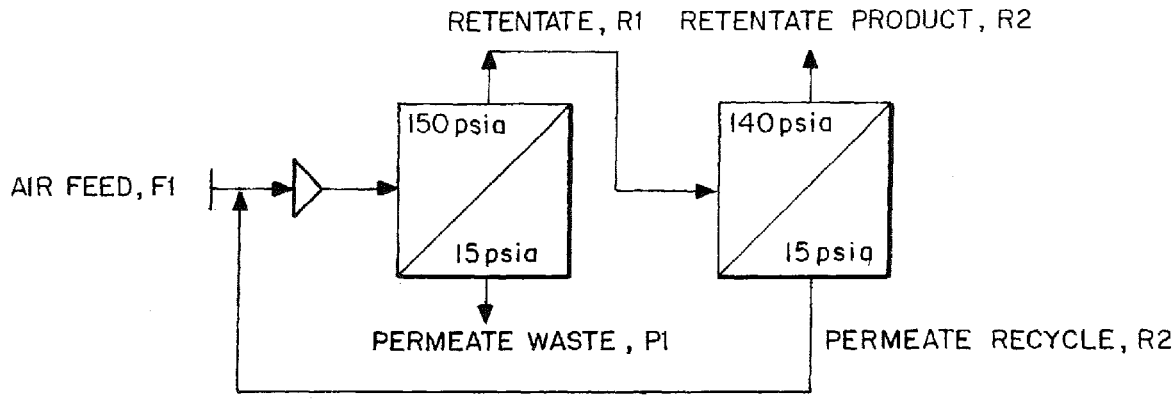

EX PARTE REEXAMINATION CERTIFICATE

THE PATENT IS HEREBY AMENDED AS INDICATED BELOW.

AS A RESULT OF REEXAMINATION, IT HAS BEEN DETERMINED THAT:

The patentability of claims 6-11 is confirmed.

Claims 1-5 are cancelled.

\* \* \* \* \*